United States Patent [19]

Bachmann et al.

[11] Patent Number: 4,515,519
[45] Date of Patent: May 7, 1985

[54] RAKING APPARATUS

[76] Inventors: Heinrich Bachmann, Erlenstrasse 6, D-7542 Schömberg-Bieselsberg; Ulrich Kollmar, Auf dem Berg 17, D-7531 Pforzheim-Würm, both of Fed. Rep. of Germany

[21] Appl. No.: 442,124

[22] Filed: Nov. 16, 1982

[30] Foreign Application Priority Data

Nov. 16, 1981 [DE] Fed. Rep. of Germany ... 8133468[U]

[51] Int. Cl.³ ............................................. B66C 23/02
[52] U.S. Cl. .................... 414/680; 414/656; 414/733; 210/523
[58] Field of Search ............... 414/652, 653, 656, 680, 414/733; 210/158, 159, 523

[56] References Cited

U.S. PATENT DOCUMENTS 1,766,573 6/1930 Westin ................................ 414/733
3,482,698 12/1969 Ostnas ................................ 210/159

FOREIGN PATENT DOCUMENTS 368142 2/1923 Fed. Rep. of Germany ...... 210/159
2921536 12/1980 Fed. Rep. of Germany ...... 210/159

Primary Examiner—Leslie J. Paperner
Assistant Examiner—Donald W. Underwood
Attorney, Agent, or Firm—Spencer & Frank

[57] ABSTRACT

A raking apparatus comprises a guide track, a carriage supported on the guide track for displacement thereon along a traveling path, a linkage assembly supported on the carriage and comprising a plurality of linkage levers articulated to one another by respective joints, and a rake supported on the carriage and operatively connected to the linkage assembly for varying angular positions of the rake by the linkage assembly upon pivotal motion of the levers with respect to one another. There is further provided a slide track receiving one of the joints for guiding it upon pivotal motion of the levers and a locking mechanism mounted on the carriage and cooperating with the linkage assembly. The locking mechanism has a released position permitting a pivotal motion of the levers and a locking position immobilizing the levers of the linkage assembly with respect to one another.

7 Claims, 4 Drawing Figures

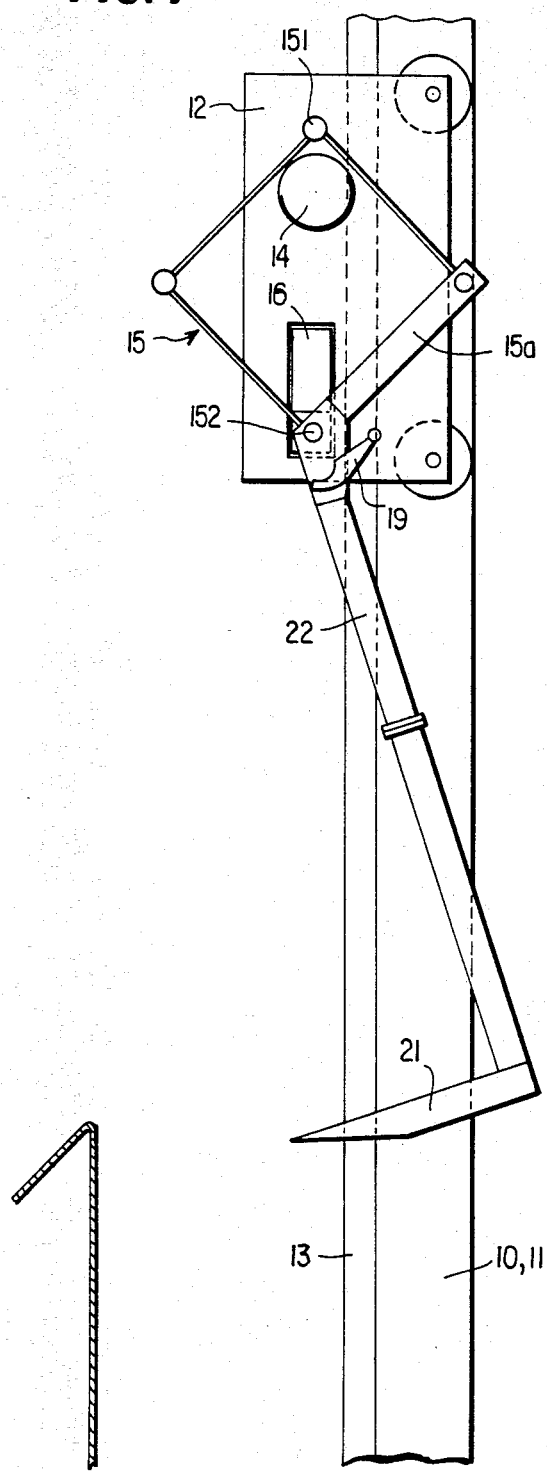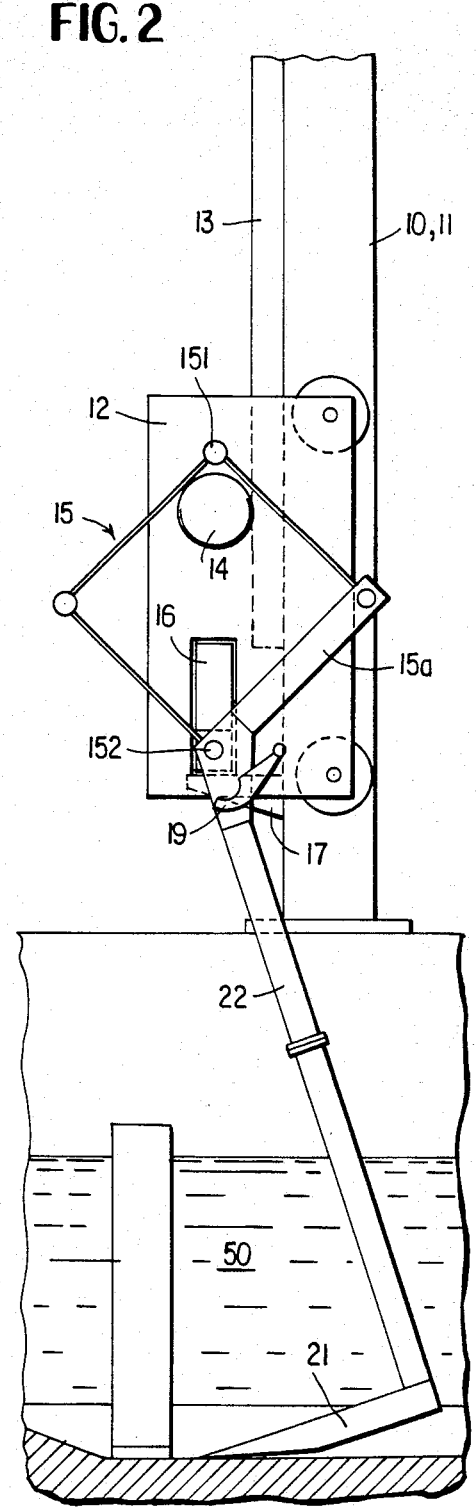

FIG. 3
FIG. 4
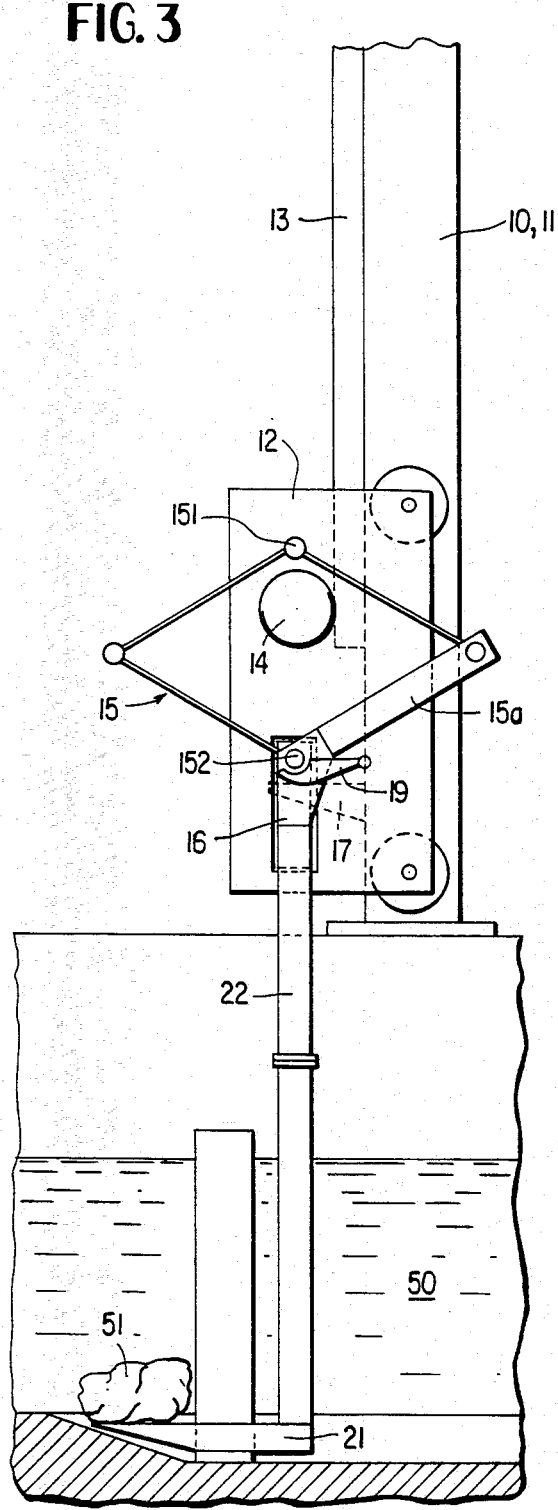
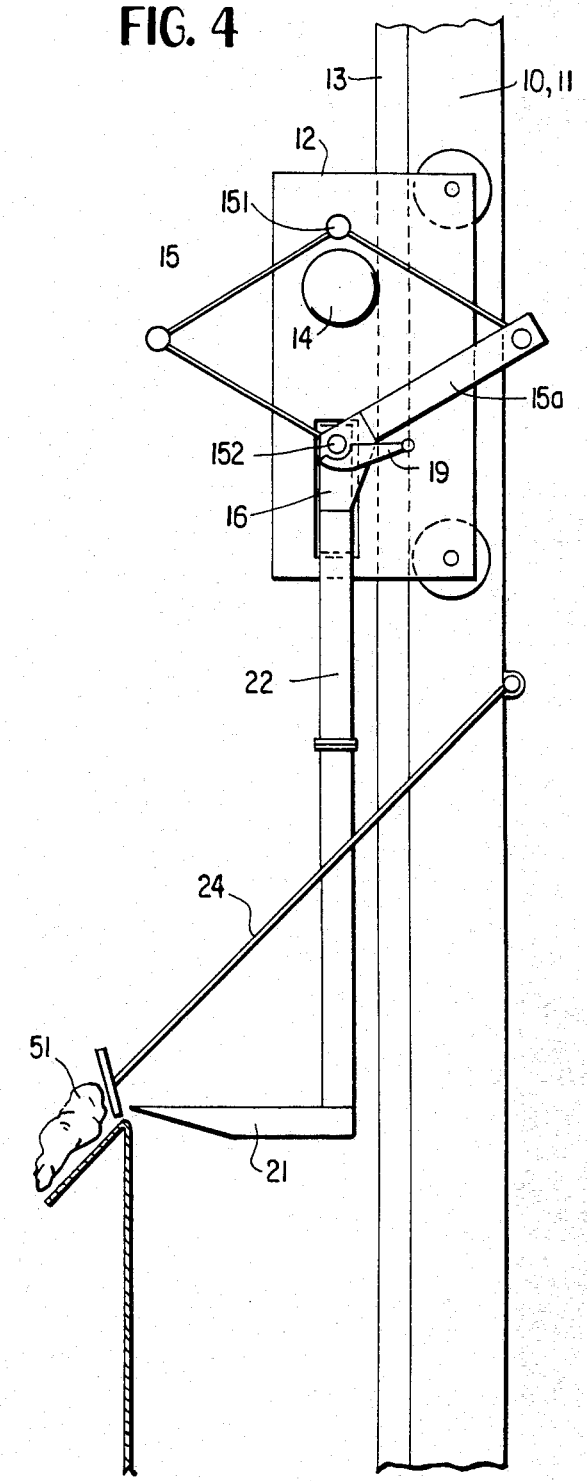

RAKING APPARATUS

BACKGROUND OF THE INVENTION

This invention relates to a raking apparatus, particularly for scooping up solid waste and removing it from the waste water.

There are known manually operated mechanisms to move the rake into and out of a waste water flow; such apparatus, however, have been noisy, difficult to handle and expensive to instal.

SUMMARY OF THE INVENTION

It is an object of the invention to provide an improved raking apparatus which has a simple mechanical structure, which needs only little maintenance and which may be installed at varying locations with ease.

This object and others to become apparent as the specification progresses, are accomplished by the invention, according to which, briefly stated, the rake is connected to a linkage assembly mounted on a carriage which is displaceable on a guide track. An articulation (joint) of the linkage assembly is guided in a slide track and further, a locking mechanism is arranged on the carriage so that the articulation and thus the linkage assembly and the rake can be immobilized in desired positions.

The linkage assembly according to the invention ensures a simple positioning of the rake as it is moved downwardly into and upwardly out of the waste water flow.

BRIEF DESCRIPTION OF THE DRAWING

FIGS. 1 through 4 are schematic side elevational views of a preferred embodiment of the invention, depicting the same structure in four different operational positions.

DESCRIPTION OF THE PREFERRED EMBODIMENT

Turning now to FIGS. 1 and 2, the raking apparatus shown therein comprises a carrier frame essentially formed of two vertical uprights 10 and 11 (only one being visible in the drawings) which are erected on either side of a waste water channel 50. The uprights 10, 11 serve as a guide track for a carriage 12 on which a motor 14 is mounted. The latter cooperates, for example, by means of pinions (not shown), with a toothed rack 13 secured to the uprights 10, 11. In this manner, the motor may drive the carriage up and down along the uprights 10, 11.

A parallelogram-type linkage assembly generally indicated at 15 is mounted by its upper joint 151 and lower joint 152 to the side of the carriage 12. While the upper joint 151 is stationarily held on the carriage 12, the lower joint 152 is supported for sliding motion in a direction parallel to the traveling direction of the carriage 12, by means of a slide track 16 mounted on the carriage 12. The slide track 16 which expediently is a slot, has upper and lower boundaries which determine upper and lower limits of pivotal displacement of the linkage assembly 15. It is conceivable to provide the slide track on the uprights 10, 11 instead of on the carriage 12. In such a case the slide track extends continuously along the entire length of the traveling path of the carriage 12.

A locking mechanism (such as pivotal bolt) 19 is provided on the carriage 12 for immobilizing the linkage assembly 15 in a predetermined position for purposes to become apparent as the specification progresses.

To a lower part of the uprights 10, 11 there is affixed a stop 17 which is abutting the lower joint 152 of the linkage assembly 15 as the carriage 12 reaches a predetermined location during its downward travel.

A rake 21 having a shaft 22 is coupled with the linkage assembly 15 such that the shaft 22 is rigidly affixed to (or forms integral part of) one lever (lower lever) 15a of the four-lever linkage assembly 15. The lower lever 15a is pivotally connected to another (upper) lever 15b of the linkage assembly 15. The upper lever 15b is mounted for articulation on the upper joint 151. It follows from the illustration of FIG. 1 that during a pivotal motion of the linkage assembly 15 during which the upper and lower joints 151 and 152 approach one another, the rake will pivot clockwise about the joint 152 and, conversely, upon motion of the upper and lower joints 151 and 152 away from one another, the rake 21 will pivot counterclockwise about the joint 152.

In the description which follows, one cycle of operation will be described.

In FIG. 1 the raking apparatus is in its initial, standby position: the carriage 12 dwells at an upper portion of the track 10, 11, the pivotal bolt 19 is in its disengaged position, the joints 151 and 152 of the parallelogram linkage assembly 15 are farthest away from one another and thus the rake shaft 22 extends downwardly in an oblique orientation above the water surface.

For starting the operational cycle of the raking apparatus, the motor 14 is energized to thus start downward motion of the carriage 12. During this downward motion the rake submerges into the waste water 50 from which solid waste 51 is to be scooped up and continues its downward motion in its oblique orientation. FIG. 2 depicts the moment when, during the downward travel of the carriage 12, the lower joint 152 abuts the stop 17 immobilized on the uprights 10, 11 at a predetermined height set dependent upon the working depth of the rake 21.

As the carriage 12 continues its downward travel, the linkage assembly 15, by virtue of the abutting relationship between the stop 17 and the lower joint 152, changes its position such that the opposite joints 151 and 152 approach one another. This causes a clockwise pivotal motion of the lever 15a about the joint 152 and thus, because of the rigid connection between the rake shaft 22 and the lever 15a, there will also occur a clockwise pivotal motion of the rake 21, 22 about the lower joint 152. This phase of operation continues until the rake 21 has pivoted into a position underneath the waste material 51. Such a position in which the carriage 12 has reached its lowermost location, is depicted in FIG. 3. Thereupon, the bolt 19 is moved into its locking position to "freeze" the parallelogram linkage assembly 15 in its configuration shown in FIG. 3.

In the consecutive operational phase the motor 14 effects an upward travel of the carriage 12. This causes a vertical lifting of the rake 21 whereby the waste material 51, accumulated on the upper face of the rake 21 is lifted out of the waste water 50. During such an upward travel of the carriage 12 the rake shaft 22 maintains its vertical orientation because the parallelogram linkage assembly 15 is "frozen" by the bolt 19.

The upward travel of the carriage 12 continues until the position of FIG. 4 is reached whereupon a stripping tool 24 pushes the waste material 51 off the rake 21 for depositing it, for example, into a container.

Thereafter, the bolt 19 is released whereupon, by virtue of the weight of the rake 21, 22, the lower joint 152 moves downwardly in the slide track 16, as a result of which the parallelogram linkage assembly 15 moves from the position shown in FIG. 4 into the position shown in FIG. 1 and thus the rake 21, 22, together with the lever 15a pivot counterclockwise to assume the initial position illustrated in FIG. 1, whereby the operational cycle is completed.

In the illustrated embodiment the uprights 10 and 11 are arranged vertically; it is to be understood, however, that any other angle of inclination is feasible in which case then occasionally additional bolting mechanisms are to be provided for the lower joint 152.

The raking apparatus according to the invention operates with a simple mechanism and is therefore simple to service. Further, it can be moved and installed in different locations rapidly and easily. Only the portions which are in contact with water are expediently of stainless steel.

By virtue of the small number of movable components, the raking operation is performed at low noise levels which makes additional sound insulation or limitation as to location of installation unnecessary.

It will be understood that the above description of the present invention is susceptible to various modifications, changes and adaptations, and the same are intended to be comprehended within the meaning and range of equivalents of the appended claims.

What is claimed is:

1. A raking apparatus comprising:
   (a) a generally vertically oriented guide track;
   (b) a carriage supported on the guide track for displacement thereon along a traveling path;
   (c) means for displacing said carriage on said guide track;
   (d) a linkage assembly supported on said carriage and comprising an upper lever having opposite upper and lower ends, a lower lever having opposite upper and lower ends, a stationary first joint pivotally mounting said upper lever to said carriage at the upper end of said upper lever, a second joint attached below said first joint; the lower end of said lower lever being pivotally secured to said second joint; said upper and lower levers being articulated to one another at their respective lower and upper ends;
   (e) a rake supported on said carriage and rigidly affixed to said lower lever for varying angular positions of said rake by said linkage assembly upon pivotal motion of said levers with respect to one another;
   (f) a slide track mounted on said carriage and receiving said second joint for guiding said second joint for sliding motion towards or away from said first joint upon said pivotal motion of said upper and lower levers;
   (g) locking means mounted on said carriage and cooperating with said lower lever; said locking means having a released position permitting said pivotal motion of said levers and a locking position immobilizing said levers with respect to one another in a predetermined angular position of said rake; and
   (h) stop means stationarily supported along said guide track at a predetermined location for abutting said second joint and displacing said second joint upwardly along said slide track with respect to said carriage during travel of said carriage through a predetermined length and location of said traveling path, whereby pivotal motion of said levers is effected for pivoting said rake into said predetermined angular position.

2. A raking apparatus as defined in claim 1, wherein said slide track for said one joint is oriented parallel to said guide track for said carriage.

3. A raking apparatus as defined in claim 1, wherein said guide track comprises two, substantially vertical uprights supported parallel to one another.

4. A raking apparatus as defined in claim 1, wherein said slide track comprises a slot receiving said second joint.

5. A raking apparatus as defined in claim 1, wherein said means for displacing said carriage comprises a drive motor mounted on said carriage.

6. A raking apparatus as defined in claim 5, further comprising a toothed rack extending parallel to said guide track; said drive motor being operatively connected to said toothed rack.

7. A raking apparatus as defined in claim 1, wherein said linkage assembly further comprises two additional levers pivotally connected to one another and to said first and second joints; said upper and lower levers and said two additional levers forming a parallelogram.

* * * * *